United States Patent
Shukh et al.

(10) Patent No.: US 6,818,330 B2
(45) Date of Patent: *Nov. 16, 2004

(54) PERPENDICULAR RECORDING MEDIUM WITH ANTIFERROMAGNETIC EXCHANGE COUPLING IN SOFT MAGNETIC UNDERLAYERS

(75) Inventors: Alexander M. Shukh, Savage, MN (US); Eric W. Singleton, Greenfield, MN (US); Sakhrat Khizroev, Pittsburgh, PA (US); Dmitri Litvinov, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 09/939,190

(22) Filed: Aug. 24, 2001

(65) Prior Publication Data

US 2002/0028357 A1 Mar. 7, 2002

Related U.S. Application Data

(60) Provisional application No. 60/227,943, filed on Aug. 25, 2000.

(51) Int. Cl.[7] .............................. G11B 5/66; G11B 5/70
(52) U.S. Cl. .............................. 428/694 TM; 428/216; 428/336; 428/694 TS; 428/900; 427/131
(58) Field of Search .................. 428/694 TM, 216, 428/336, 900, 694 TS; 360/97.01; 427/128, 131

(56) References Cited

U.S. PATENT DOCUMENTS

| | | | |
|---|---|---|---|
| 4,410,603 A | 10/1983 | Yamamori et al. .......... 428/611 |
| 4,629,660 A | 12/1986 | Sagoi et al. ................ 418/618 |
| 4,687,712 A * | 8/1987 | Sugita et al. ............... 428/611 |
| 5,447,781 A | 9/1995 | Kano et al. ................. 428/212 |
| 5,465,185 A | 11/1995 | Heim et al. ................. 360/113 |
| 5,830,569 A | 11/1998 | Hikosaka et al. ........... 428/332 |
| 5,895,712 A | 4/1999 | Chen et al. ................. 428/332 |
| 5,900,324 A | 5/1999 | Moroishi et al. ........... 428/611 |
| 6,001,447 A | 12/1999 | Tanahashi et al. ......... 428/65.3 |
| 6,090,480 A | 7/2000 | Hayashi ..................... 428/332 |
| 6,228,515 B1 | 5/2001 | Shin et al. ............. 428/694 TS |
| 6,261,681 B1 | 7/2001 | Suekane et al. ............ 428/332 |
| 6,270,885 B1 | 8/2001 | Hokkyo et al. ............. 428/332 |
| 6,280,813 B1 * | 8/2001 | Carey et al. ............... 428/65.3 |
| 6,456,467 B1 * | 9/2002 | Mao et al. .................. 360/319 |
| 6,641,935 B1 * | 11/2003 | Li et al. ................. 428/694 TS |
| 6,645,614 B1 * | 11/2003 | Girt et al. ................... 428/336 |
| 6,686,070 B1 * | 2/2004 | Futamoto et al. ...... 428/694 TS |

\* cited by examiner

*Primary Examiner*—Holly Rickman
(74) *Attorney, Agent, or Firm*—Benjamin T. Queen, II; Pietragallo, Bosick & Gordon

(57) ABSTRACT

A perpendicular magnetic recording medium with antiferromagnetic coupling in a soft magnetic underlayer. The soft magnetic underlayer includes a first magnetic soft layer, a first interface layer on the first magnetic soft layer, a second magnetic soft layer, a second interface layer on the second magnetic soft layer, and a non-magnetic coupling layer between the first interface layer and the second interface layer. The first and second magnetic soft layers are antiferromagnetically exchange coupled to one another through the non-magnetic coupling layer, wherein the first and second interface layers increase the exchange coupling between the first and second magnetic soft layers.

24 Claims, 3 Drawing Sheets

PERPENDICULAR RECORDING MEDIUM WITH ANTIFERROMAGNETIC EXCHANGE COUPLING IN SOFT MAGNETIC UNDERLAYERS

CROSS REFERENCE TO RELATED APPLICATION

This application claims the benefit of U.S. Provisional Application No. 60/227,943 filed Aug. 25, 2000.

FIELD OF THE INVENTION

The invention relates to perpendicular magnetic recording media, and more particularly, relates to a soft magnetic underlayer of such media.

BACKGROUND OF THE INVENTION

Perpendicular magnetic recording systems have been developed for use in computer hard disc drives. A typical perpendicular recording head includes a trailing write pole, a leading return or opposing pole magnetically coupled to the write pole, and an electrically conductive magnetizing coil surrounding the yoke of the write pole. A perpendicular recording medium may include a hard magnetic recording layer and a soft magnetic underlayer, which provide a flux path from the trailing write pole to leading opposing pole of the writer.

To write to the magnetic recording medium, the recording head is separated from the magnetic recording medium by distance known as the flying height. The magnetic recording medium is moved past the recording head so that the recording head follows the tracks of the magnetic recording medium, with the magnetic recording medium first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

In addition, the soft underlayer helps during the read operation. During the read back process, the soft underlayer produces the image of magnetic charges in the magnetically hard layer, effectively increasing the magnetic flux coming from the medium. This provides a higher playback signal.

Perpendicular recording designs have the potential to support much higher linear densities than conventional longitudinal designs due to a reduced demagnetizing field in the recording transitions. In addition, the described bilayer medium is used in perpendicular recording to allow increased efficiency of the recording head. The soft magnetic underlayer of the perpendicular recording medium forms inverse image charges and substantially magnifies both the write field during recording and the fringing field of the recorded transition during reproduction. The quality of the image, and therefore the effectiveness of the soft underlayer, depends upon the permeability of the soft underlayer. The write and fringing field both increase rapidly when the soft underlayer permeability increases in the range from 1 to 100. Once the soft underlayer permeability goes above 100, the effect of the permeability on the write and fringing field is marginal. Therefore, to provide high efficiency of the recording head, the soft underlayer efficiency should not be less than 100.

To support the high image efficiency, the soft underlayer should be in an unsaturated state. However, during recording a top portion of the soft underlayer is likely to be saturated. Therefore, thickness and magnetic saturation induction, $B_S$, of the soft underlayer needs to be matched to appropriate parameters of the recording head. Magnetic saturation of the soft underlayer causing the permeability reduction will result in write field degradation. Therefore, the soft underlayer should be relatively thick and have a high magnetic saturation induction, e.g. $B_S$>1 Tesla.

However, one of the challenges of implementing perpendicular recording is to resolve the problem of soft underlayer noise. The noise may be caused by fringing fields generated by magnetic domains, or uncompensated magnetic charges, in the soft underlayer that can be sensed by the reader. If the magnetic domain distribution of such materials is not carefully controlled, very large fringing fields can introduce substantial amounts of noise in the read element. Not only can the reader sense the steady state distribution of magnetization in the soft underlayer, but it can also affect the distribution of magnetization in the soft underlayer, thus generating time dependent noise. Both types of noise should be minimized.

In addition, the soft underlayer may form stripe domains, which generate noticeable noise and considerably reduce the signal-to-noise ratio of the recording medium. These stripe domains in the soft underlayer can be suppressed by applying an in-plane bias field. The bias field increases the effective anisotropy field of the soft underlayer and prevents domain formation that results in a permeability decrease. Techniques, such as, for example, permanent magnet or antiferromagnetic exchange biasing, are used to form the in-plane bias field. The permanent magnet technique assumes an application of high coercively magnetic film that generates a strong bias-fringing field. The antiferromagnetic exchange technique is based on antiferromagnetic film use. The antiferromagnetic film is placed in direct contact with the ferromagnetic soft layer and forms antiferromagnetic exchange coupling between the layers. Both of these techniques have disadvantages, such as, for example, high coercivity and low thermal stability of the biased soft underlayer. In addition, the antiferromagnetic materials have low corrosion resistance and require high temperature annealing to form exchange coupling. To be maintained in the single domain state by means of the antiferromagnetic exchange coupling or permanent magnet bias, the soft underlayer should be relatively thin. However, the relatively thin soft underlayer may not be useable due to its possible saturation during recording. Increase of the soft underlayer coercivity may also be unacceptable due to an increase in noise in the recording medium.

There is identified a need for a perpendicular magnetic recording medium with a soft magnetic underlayer that overcomes limitations, disadvantages, or shortcomings of known perpendicular magnetic recording mediums.

SUMMARY OF THE INVENTION

The invention meets the identified need, as well as other needs, as will be more fully understood following a review of this specification and drawings.

In accordance with an aspect of the invention, a perpendicular magnetic recording medium comprises a hard magnetic recording layer and a soft magnetic underlayer under the magnetic recording layer. The soft magnetic underlayer comprises a laminated structure which includes a first magnetic soft layer, a first interface layer on the first magnetic soft layer, a second magnetic soft layer, a second interface layer on the second magnetic soft layer, and a non-magnetic coupling layer between the first interface layer and the second interface layer. The first and second magnetic soft layers are antiferromagnetically coupled to one another via predominantly exchange interaction through the non-magnetic coupling layer. In addition, the first and second interface layers increase the exchange coupling effect between the first and second magnetic soft layers. The perpendicular recording medium may comprise additional soft magnetic underlayers having the same or similar structure as the described soft magnetic underlayer.

In accordance with another aspect of the invention, a perpendicular magnetic recording medium comprises a hard magnetic recording layer and a laminated soft magnetic underlayer under the hard magnetic recording layer. The laminated soft magnetic underlayer comprises means for antiferromagnetically exchange coupling the laminations thereof to one another.

In accordance with yet another aspect of the invention, a laminated soft magnetic underlayer of a perpendicular magnetic recording medium comprises a first magnetic layer, a first interface layer on the first magnetic soft layer, a second magnetic soft layer, a second interface layer on the second magnetic soft layer, and a non-magnetic coupling layer between the first interface layer and the second interface layer.

In accordance with a further aspect of the invention, a magnetic disc drive storage system comprises a housing, a perpendicular magnetic recording medium positioned in the housing, and a movable recording head mounted in the housing adjacent the perpendicular magnetic recording medium. The perpendicular magnetic recording medium comprises a hard magnetic recording layer and a soft magnetic underlayer under the hard magnetic recording layer. The soft magnetic underlayer comprises a first magnetic soft layer, a first interface layer on the first magnetic soft layer, a second magnetic soft layer, a second interface layer on the second magnetic soft layer, and a non-magnetic coupling layer between the first interface layer and the second interface layer.

In accordance with an additional aspect of the invention, a method of making a laminated magnetically soft underlayer of a perpendicular magnetic recording medium includes depositing a first magnetic soft layer on a substrate, depositing a first interface layer on the first magnetic soft layer, depositing a non-magnetic coupling layer on the first interface layer, depositing a second interface layer on the non-magnetic coupling layer, and depositing a second magnetic soft layer on the second interface layer.

DETAILED DESCRIPTION OF THE INVENTION

The invention provides a perpendicular recording medium with antiferromagnetic exchange coupling in a soft magnetic underlayer of the perpendicular recording medium. The invention is particularly suitable for use with a magnetic disc storage system. A recording head, as used herein, is defined as a head capable of performing read and/or write operations. Antiferromagnetic coupling, as used herein, generally refers to the coupling between ferromagnetic layers such that adjacent ferromagnetic layers have magnetizations that point in opposite directions as a result of the coupling which is predominantly exchange interaction between the ferromagnetic layers.

Figure 1:
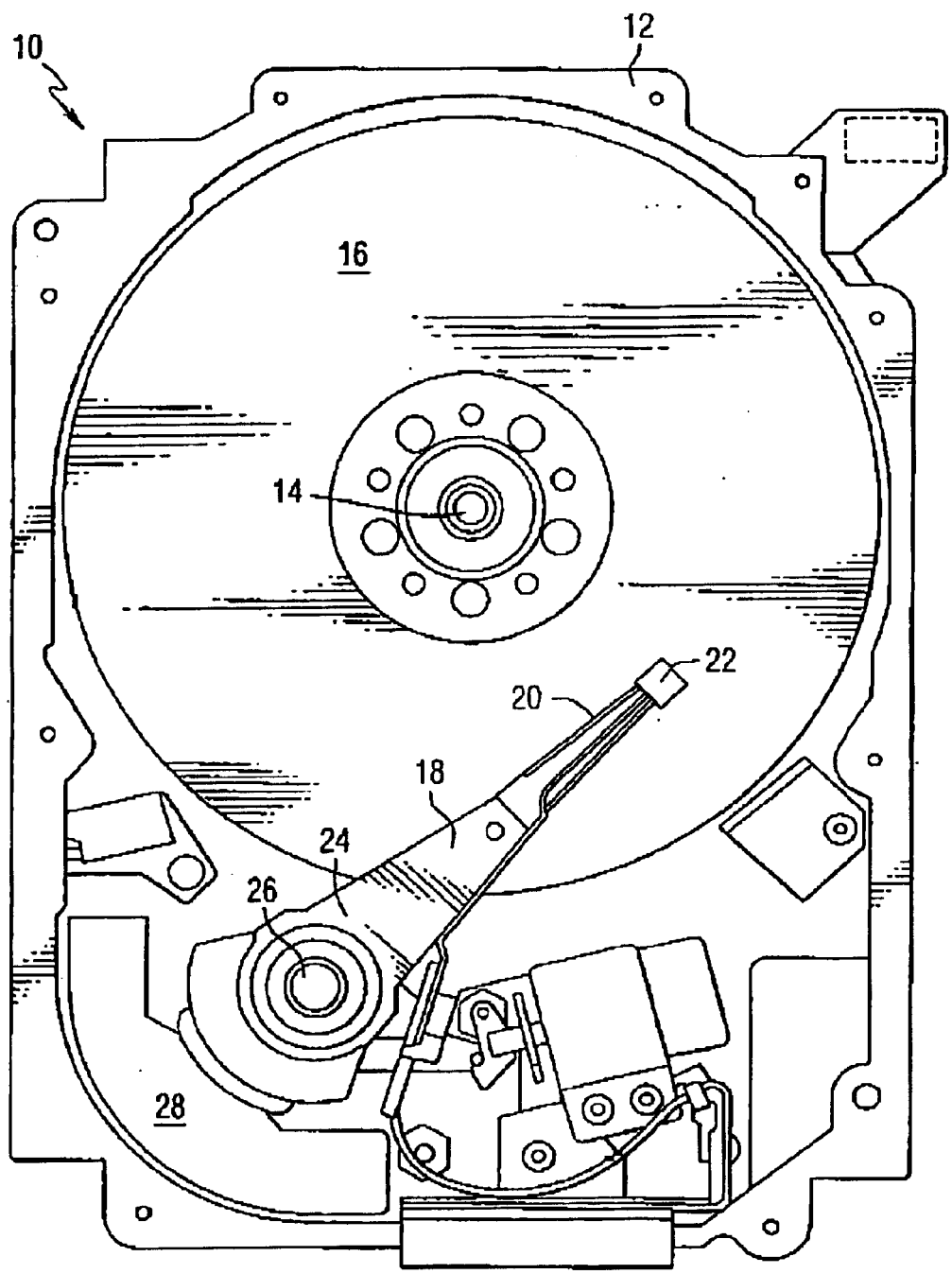
FIG. 1 is a pictorial representation of a disc drive that can use the perpendicular recording medium constructed in accordance with this invention.

FIG. 1 is a pictorial representation of a disc drive 10 that can utilize the perpendicular recording medium with antiferromagnetic exchange coupling in a soft magnetic underlayer in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector of the disc 16. The actuator motor 28 is regulated by a controller, which is not shown in this view and is well known in the art.

Figure 2:
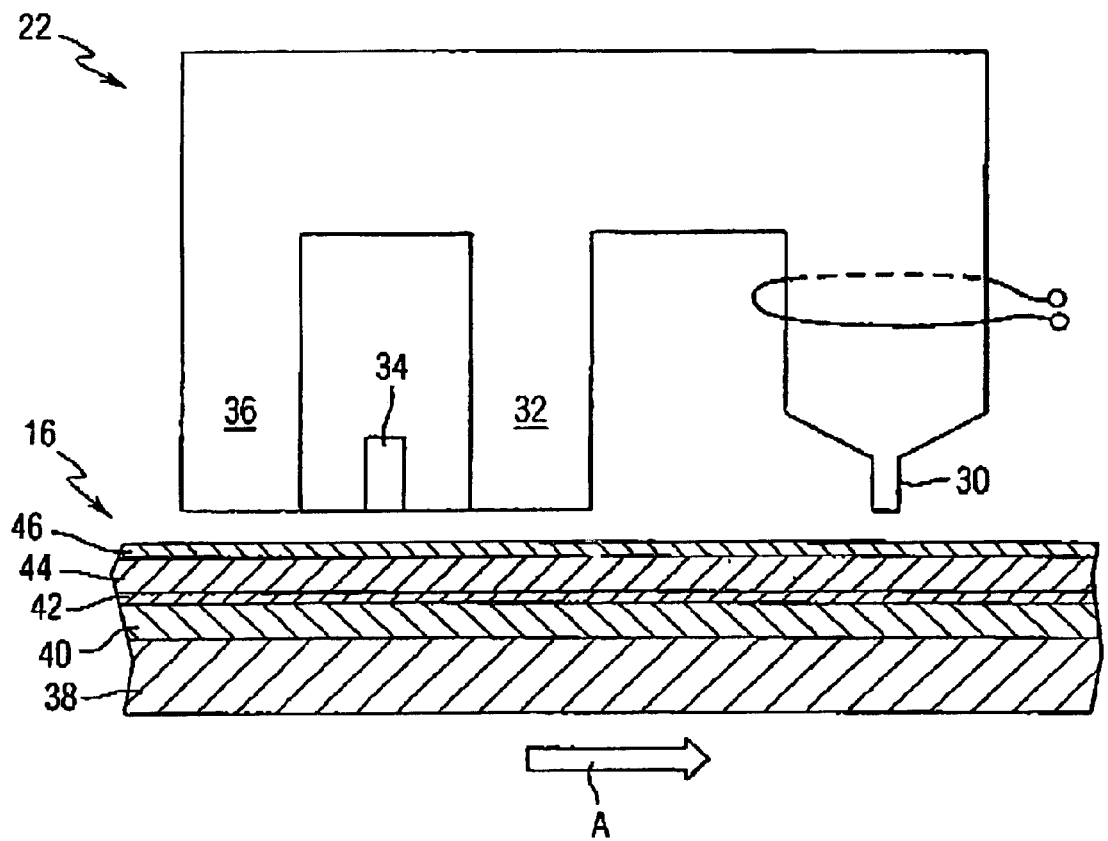
FIG. 2 is a partially schematic side view of a perpendicular recording head and a perpendicular recording medium constructed in accordance with this invention.

FIG. 2 is a partially schematic side view of a perpendicular magnetic recording head 22 and a perpendicular recording magnetic medium 16. The recording head 22 is well known in the art and includes a writer section comprising a trailing main pole 30 and a return or opposing pole 32. The recording head 22 also includes a reader section comprising a read element 34 positioned between a reader pole 36 and the opposing pole 32. The read element 34 may be a conventional GMR reader, MR reader, inductive reader, or the like. In the embodiment shown in FIG. 2, the reader section shares the opposing pole 32 of the writer section.

Still referring to FIG. 2, the perpendicular magnetic recording medium 16 is positioned under the recording head 22. The recording medium 16 travels in the direction of arrow A during recording. The recording medium 16 includes a substrate 38, which may be made of any suitable material such as ceramic glass, amorphous glass, or NiP plated AlMg. A soft magnetic underlayer 40 is deposited on the substrate 38. The soft magnetic underlayer, in accordance with the invention, is a laminated soft magnetic underlayer, which will be described in detail herein. A spacer layer 42 may be deposited on the soft magnetic underlayer 40. The spacer layer 42 may be made of any suitable material such as at least one material selected from Cr, Ti, Ta, and $TiO_2$. In addition, the spacer layer may have a thickness from about 5 to about 50 angstroms. A hard magnetic recording layer 44, which in this invention is a perpendicular recording layer, is deposited on the spacer layer 42. Suitable hard magnetic materials for the hard magnetic recording layer 44 may include at least one material selected from CoCr, FePd, CoPd, CoFePd, and CoCrPd. The hard magnetic layer 44 may have a thickness from about 2 nm to about 40 nm. A protective overcoat 46, such as a diamond-like carbon, may be applied over the hard magnetic recording layer 44.

Figure 3:
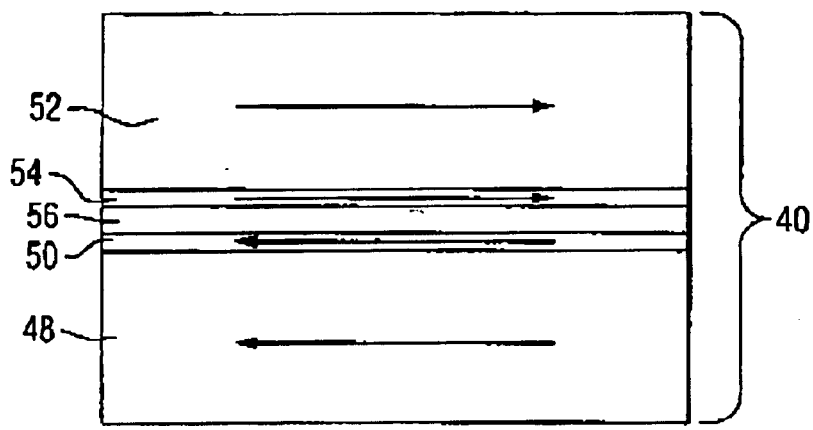
FIG. 3 is a partially schematic view of a soft magnetic underlayer constructed in accordance with this invention.

Referring to FIG. 3, the soft magnetic underlayer 40 is shown in more detail. The soft magnetic underlayer 40 includes a first magnetic soft layer 48 and a first interface layer 50 on the first magnetic soft layer 48. The soft magnetic underlayer 40 further includes a second magnetic soft layer 52 and a second interface layer 54 on the second magnetic soft layer 52. A non-magnetic coupling layer 56 is positioned between the first interface layer 50 and the second interface layer 54. For purposes of clarity, the thickness of the layers of the soft magnetic underlayer 40 is not drawn to scale.

The first and second magnetic soft layers 48 and 52 may be formed from at least one suitable material selected from NiFe, CoNiFe, CoNiZr, CoFe, CoFeB, FeSiC, and FeAlN. The thickness of each layer 48 and 52 may range from about 10 nm to about 200 nm.

The first and second interface layers 50 and 54 may be formed from at least one suitable material selected from Co, CoFe, and CoFeB. The thickness of each layer 50 and 54 may range from about 5 to about 10 angstroms.

The non-magnetic coupling layer 56 may be formed from at least one suitable material selected from Ru, Rh, Re, Cr, and Cu. The thickness of the non-magnetic coupling layer 56 may range from about 0.3 nm to about 5 nm.

In accordance with the invention, a single layer ferromagnetic soft underlayer is replaced by a laminated structure comprising multi-layers of ferromagnetic materials 48, 50 and 52, 54 separated by a thin non-magnetic coupling layer 56. The ferromagnetic layers 48, 50 and 52, 54 are antiferromagnetically exchanged coupled to one another by means of the appropriate type and thickness of non-magnetic coupling layer 56 such that their magnetizations are oriented antiparallel to one another, as shown in FIG. 3. The exchange antiferromagnetic coupling forms a strong in-plane bias field that maintains the ferromagnetic coupled layers 48, 50 and 52, 54 in a mostly single domain state. The exchange coupling field, or saturation field, depends on properties and crystalline structure of the ferromagnetic and non-magnetic materials used in the multi-layer structure to form the soft magnetic underlayer 40, as well as on the thickness of the ferromagnetic layers 48, 50 and 52, 54 and the thickness of the non-magnetic coupling layer 56.

The thickness of the non-magnetic coupling layer 56 has a direct relationship to the exchange coupling field. While the relationship may vary for different materials, generally, the value of the exchange coupling field has an oscillatory character and exhibits several local maximums as a function of the thickness of the non-magnetic coupling layer 56 (for more detailed discussion of the oscillatory character and local maximums, see U.S. Pat. No. 5,465,185). As the thickness of the non-magnetic coupling layer 56 increases, the magnitude of the local maximums decrease. Therefore, to provide suitable exchange coupling capable of maintaining the soft magnetic underlayer 40 in the single domain state, the thickness of the non-magnetic coupling layer 56 should correspond to one of the local maximums of the saturation field on the oscillatory dependence. For example, it has been determined that for a non-magnetic coupling layer 56 formed of Ru, the most promising local maximums are the first and second maximums where the exchange coupling is very high. The first antiferromagnetic maximum on the oscillatory dependence takes place with the non-magnetic coupling layer 56 having a thickness of from about 3 to about 8 angstroms. At the second maximum, which is observed at the thickness of about 14 to about 25 angstroms, the exchange coupling energy is weaker compared to the first maximum but still strong enough to maintain the ferromagnetic layers 48, 50 and 52, 54 in the single domain state. In addition, due to the relatively high thickness of the non-magnetic coupling layer 56 at the second maximum, the soft underlayer properties are less sensitive to the interface roughness.

The exchange coupling field also depends on the thickness of the ferromagnetic layers 48, 50 and 52, 54 and exponentially decays with an increase in the thickness. Accordingly, by selection of the appropriate thickness of the ferromagnetic layers 48, 50 and 52, 54 for each particular antiferromagnetic maximum of the oscillatory dependence, as discussed herein, the soft magnetic underlayer 40 can be maintained in a generally stable single domain state. This single domain state may correspond to the value of the initial permeability of the multi-layer soft magnetic underlayer 40 when the initial permeability is below 500, which is also acceptable for image efficiency.

Therefore, in accordance with the invention, selection of the discussed parameters for the ferromagnetic layers 48, 50 and 52, 54 results in the ferromagnetic layers having high magnetic saturation induction, low coercivity and magnetostriction. To further enhance the exchange coupling energy between the ferromagnetic layers 48 and 52, relatively thin interface layers 50 and 54, also made of ferromagnetic materials, are positioned in between the first and second magnetic soft layers 48 and 52 and the non-magnetic coupling layer 56, as illustrated in FIG. 3. The interface layers 50 and 54 have a higher degree of polarization than the layers 58 and 52 to provide the described enhanced exchange coupling. The interface layers 50 and 54 also enhance the thermal stability of the soft magnetic underlayer 40 as well.

More specifically, the interface layers 50 and 54 are made of materials with a higher degree of electron spin polarization, such as CoFe, i.e., a larger fraction of electrons have their spins aligned along the magnetization direction in the material. Since exchange coupling is a quantum-mechanical effect that strongly depends on spin polarization of electrons within adjacent layers, to achieve the maximum exchange interaction between adjacent ferromagnetic layers, it is beneficial to utilize ferromagnetic layers in which electrons spins are highly polarized. Due to various materials properties, such layers of high quality that are, for example, uniform, stress-free, have low magnetorestriction, cannot be grown sufficiently thick. Accordingly, it is desirable to have such highly polarizable thin layers at the interface while keeping the remainder of the soft underlayer structure made of conventional, easily deposited materials (e.g. NiFe).

In accordance with the invention, the described structure of the soft magnetic underlayer 40 depends on the coercivity of the hard magnetic storage layer 44. For a hard storage layer 44 with a coercivity below, for example, 8000 Oe, the following structure of the soft magnetic underlayer 40 may be proposed: [$Ni_{45}Fe_{55}$(30 nm)/CoFe(1 nm)/Ru(2 nm)/CoFe(1 nm)/$Ni_{45}Fe_{55}$(30 nm)]. The initial permeability of such a soft magnetic underlayer 40 is about 300. For this particular example illustrating the invention, CoFe is a highly polarizable material that may serve as the interface layers 50 and 54. NiFe may serve as the first and second magnetic soft layers 48 and 52. The exchange interaction is between the CoFe layers 50 and 52. The NiFe layers 48 and 52 are ferromagnetically exchanged coupled to the CoFe layers 50 and 54 such that the magnetization directions in adjacent layers 48 and 50 coincide and the magnetization directions in adjacent layers 52 and 54 coincide. Also in this example, Ru is the material used as the non-magnetic spacer layer 56.

Figure 4:
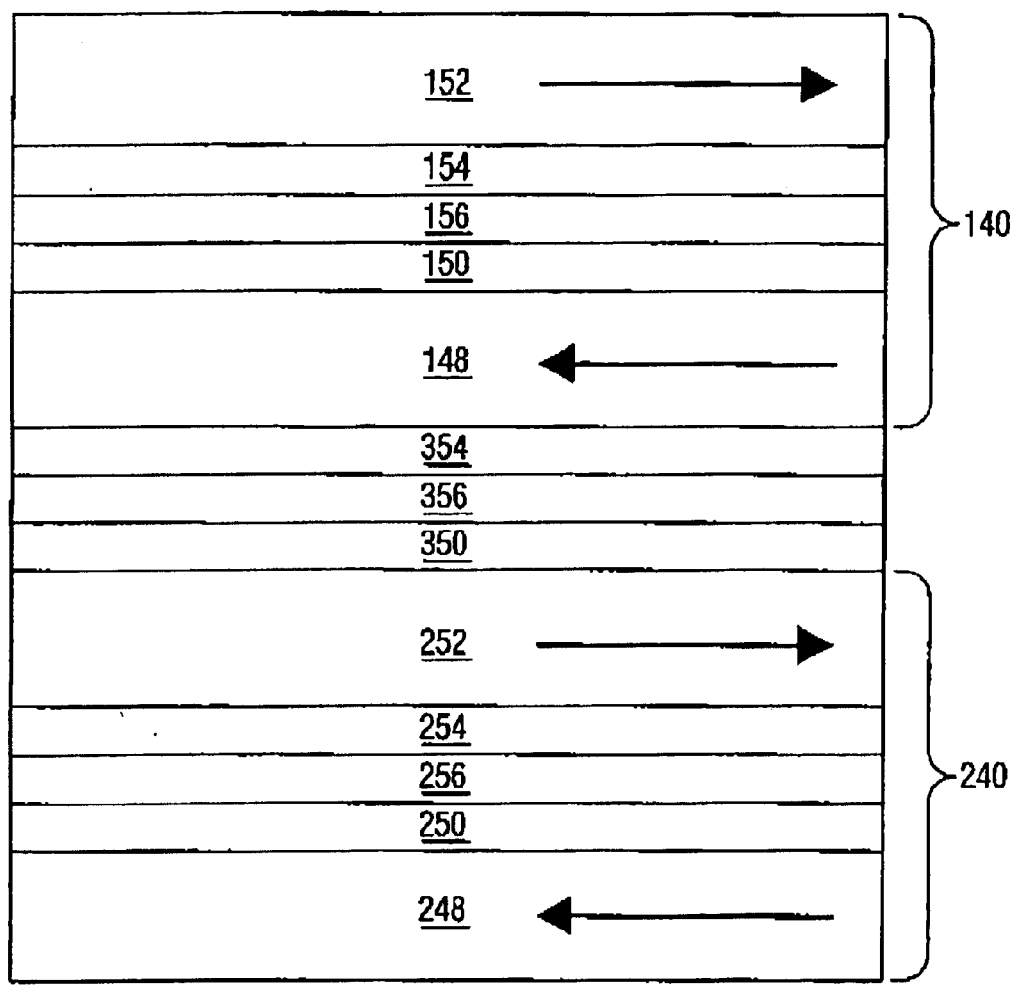
FIG. 4 is a partially schematic view of an additional embodiment of a soft magnetic underlayer constructed in accordance with this invention.

Referring to FIG. 4, there is illustrated an additional embodiment of the invention. Specifically, this embodiment includes a soft magnetic underlayer 140 and an additional soft magnetic underlayer 240, both of which are similar in construction to the soft magnetic underlayer 40 shown and described herein. The soft magnetic underlayer 140 includes a first magnetic soft layer 148 and a first interface layer 150 on the first magnetic soft layer 148. The soft magnetic underlayer 140 further includes a second magnetic soft layer 152 and a second interface layer 154 on the second magnetic soft layer 152. A non-magnetic coupling layer 156 is positioned between the first interface layer 150 and the second interface layer 154. Similarly, the soft magnetic underlayer 240 includes a first magnetic soft layer 248 and a first interface layer 250 on the first magnetic soft layer 248. The soft magnetic underlayer 240 further includes a second magnetic soft layer 252 and a second interface layer 254 on the second magnetic soft layer 252. A non-magnetic coupling layer 256 is positioned between the first interface layer 250 and the second interface layer 254. For purposes of clarity, the thickness of the layers of the soft magnetic underlayers 140 and 240 are not drawn to scale and it will be appreciated that the various layers may be formed of different materials having different thickness, as desired.

Still referring to FIG. 4, the first magnetic soft layer 148 may include an additional interface layer 354 formed thereon. In addition, the second magnetic soft layer 252 may include an additional interface layer 350 formed thereon. A non-magnetic coupling layer 356 is positioned between the additional interface layer 350 and the additional interface layer 354. The additional interface layers 350 and 354 in conjunction with the non-magnetic coupling layer 356 serve to antiferromagnetically exchange couple the magnetic soft layers 148 and 152 in essentially the same manner as described herein for the other interface and non-magnetic coupling layers.

In addition, it may be desirable, although not required, to control the direction of magnetization in the soft magnetic underlayer 40. This direction of the magnetization can be achieved in several different ways. For example, providing for deposition and an external magnetic field leads to the easy access of the soft underlayer 40 being oriented in the direction of the field. Alternatively, post deposition annealing in external magnetic fields leads to similar results. Yet another option is for seed layers and variation of deposition parameters, such as, sputtering pressure, sputtering power, location of the sputtering target with respect to the substrate, can be used to define the uniaxial anisotropy in the layers that make up the soft magnetic underlayer 40. An additional technique is to provide for deposition of the soft underlayer structure on top of an antiferromagnetic material and consequent annealing in external magnetic fields to activate the exchange bias field between the antiferromagnetic materials and the ferromagnetic film on top of it. It is also possible to deposit at an elevated temperature in the presence of external magnetic fields to avoid the necessity of post-annealing. This approach can potentially produce the best possible results in the most straightforward manner. The biasing field would force the ferromagnetic layers into a single domain state and work as a stabilizing factor to keep the layers in such a state.

In accordance with the description of the invention set forth herein, a method of making the laminated magnetically soft underlayer 40 of a perpendicular magnetic recording medium 16 may include depositing the first magnetic soft layer 48 on the substrate 38 followed by depositing the first interface layer 50 on the first magnetic soft layer 48. The method next includes depositing a non-magnetic coupling layer 56 on the first interface layer 50. The method also includes depositing a second interface layer 54 on the non-magnetic coupling layer 56 followed by depositing a second magnetic soft layer 52 on the second interface layer 54.

The described recording medium may be manufactured using conventional media tools. For example, deposition of the soft magnetic underlayer 40, and specifically the laminations thereof, on the substrate 38 may be accomplished by standard lithography techniques, followed by sequential sputtered deposition of the described layers and then possibly followed by chemical mechanical polishing. Alternatively, the layers, which make up the soft magnetic underlayer 40 may be deposited sequentially by, for example, sputtering. Standard techniques for making patterned media, such as stamping may also be employed.

Whereas particular embodiments of the invention have been described herein for the purpose of illustrating the invention and not for purpose of limiting the same, it will be appreciated by those of ordinary skill in the art that numerous variations of the details, materials, and arrangements of parts may be made within the principle and scope of the invention without departing from the invention as described herein and in the appended claims. For example, multiple arrangements of the soft magnetic underlayer 40 may be constructed by repeating the structure of a soft magnetic layer adjacent to an interface layer adjacent to a non-magnetic coupling layer.

What is claimed is:

1. A perpendicular magnetic recording medium, comprising:
   a hard magnetic recording layer; and
   a soft magnetic underlayer under the hard magnetic recording layer, wherein the soft magnetic underlayer comprises:
      a first magnetic soft layer;
      a first interface layer on the first magnetic soft layer;
      a second magnetic soft layer;
      a second interface layer on the second magnetic soft layer; and
      a non-magnetic coupling layer between the first interface layer and the second interface layer for antiferromagnetically coupling said first magnetic soft layer and said second magnetic soft layer.

2. The recording medium of claim 1, wherein said first and second magnetic soft layers comprise at least one of NiFe, CoNiFe, CoNiZr, CoFe, CoFeB, FeSiC, or FeAlN.

3. The recording medium of claim 1, wherein said first and second magnetic soft layers each have a thickness of from about 10 nm to about 200 nm.

4. The recording medium of claim 1, wherein said first and second interface layers comprise at least one of Co, CoFe, or CoFeB.

5. The recording medium of claim 1, wherein said first and second interface layers each have a thickness of from about 5 to about 10 angstroms.

6. The recording medium of claim 1, wherein said non-magnetic coupling layer comprises at least one of Ru, Rh, Re, or Cu.

7. The recording medium of claim 1, wherein said non-magnetic coupling layer has a thickness of from about 0.3 nm to about 5 nm.

8. The recording medium of claim 1 wherein said hard magnetic layer comprises at least one of CoCr, FePd, CoPd, CoFePd, or CoCrPd.

9. The recording medium of claim 1, wherein said hard magnetic layer has a thickness from about 2 nm to about 40 nm.

10. The recording medium of claim 1, further comprising a spacer layer between said hard magnetic recording layer and said soft magnetic underlayer.

11. The recording medium of claim 10, wherein said spacer layer comprises at least one of Cr, Ti, Ta, or $TiO_2$.

12. The recording medium of claim 1, wherein said spacer layer has a thickness from about 5 to about 50 angstroms.

13. The recording medium of claim 1, wherein said first and second interface layers increase the exchange coupling between said first and second magnetic soft layers.

14. The recording medium of claim 1, further comprising:
an additional soft magnetic underlayer under said soft magnetic underlayer and said hard magnetic recording layer, said additional soft magnetic underlayer comprising:
a first magnetic soft layer;
a first interface layer on the first magnetic soft layer;
a second magnetic soft layer;
a second interface layer on the second magnetic soft layer; and
a non-magnetic coupling layer between the first interface layer and the second interface layer for antiferromagnetically coupling said first magnetic soft layer and said second magnetic soft layer.

15. A laminated soft magnetic underlayer of a perpendicular magnetic recording medium, comprising:
a first magnetic soft layer;
a first interface layer on the first magnetic soft layer;
a second magnetic soft layer;
a second interface layer on the second magnetic soft layer; and
a non-magnetic coupling layer between the first interface layer and the second interface layer for antiferromagnetically coupling said first magnetic soft layer and said second magnetic soft layer.

16. A magnetic disc drive storage system, comprising:
a housing;
a perpendicular magnetic recording medium positioned in said housing;
a movable recording head mounted in said housing adjacent said perpendicular magnetic recording medium; and
said perpendicular magnetic recording medium comprising:
a hard magnetic recording layer; and
a soft magnetic underlayer under the hard magnetic recording layer, wherein the soft magnetic underlayer comprises:
a first magnetic soft layer;
a first interface layer on the first magnetic soft layer;
second magnetic soft layer;
a second interface layer on the second magnetic soft layer; and
a non-magnetic coupling layer between the first interface layer and the second interface layer for antiferromagnetically coupling said first magnetic soft layer and said second magnetic soft layer.

17. A method of making a laminated magnetically soft underlayer of a perpendicular magnetic recording medium, comprising:
depositing a first magnetic soft layer on a substrate;
depositing a first interface layer on the first magnetic soft layer;
depositing a non-magnetic coupling layer on the first interface layer;
depositing a second interface layer on the magnetic coupling layer; and
depositing a second magnetic soft layer on the second interface layer for antiferromagnetically coupling said first magnetic soft layer and said second magnetic soft layer.

18. The method of claim 17, further comprising depositing a hard magnetic recording layer on the laminated magnetically soft underlayer.

19. The method of claim 17, including forming the first and second magnetic soft layers from at least one of NiFe, CoNiFe, CoNiZr, CoFe, CoFeB, FeSiC, or FeAlN.

20. The method of claim 17, forming the first and second magnetic soft layers to each has a thickness of from about 10 nm to about 200 nm.

21. The method of claim 17, including forming the first and second interface layers from at least one of Co, CoFe, or CoFeB.

22. The method of claim 17, including forming the first and second magnetic soft layers to each has a thickness of from about 5 nm to about 10 angstroms.

23. The method of claim 17, including forming the non-magnetic coupling layer from at least one of Ru, Rh, Re, Cr, or Cu.

24. The method of claim 17, including forming the non-magnetic coupling layer to have a thickness of from about 0.3 nm to about 5 nm.

* * * * *

UNITED STATES PATENT AND TRADEMARK OFFICE
CERTIFICATE OF CORRECTION

PATENT NO. : 6,818,330 B2  
DATED : November 16, 2004  
INVENTOR(S) : Alexander M. Shukh et al.

Page 1 of 1

It is certified that error appears in the above-identified patent and that said Letters Patent is hereby corrected as shown below:

<u>Column 8,</u>
Line 53, after "Re," add -- Cr, --.

<u>Column 10,</u>
Line 2, before "second" add -- a --.
Line 30, before "forming" add -- including --.
Line 31, "has" should read -- have --.
Line 38, after "5" delete "nm".

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,818,330 B2
DATED : November 16, 2004
INVENTOR(S) : Alexander M. Shukh et al.

It is certified that error appears in the above-identified patent and that said Letters Patent is hereby corrected as shown below:

Column 8,
Line 53, after "Re," add -- Cr, --.

Column 10,
Line 2, before "second" add -- a --.
Line 30, before "forming" add -- including --.
Line 31, "has" should read -- have --.
Line 38, after "5" delete "nm".
Line 37, "has" should read -- have --.

This certificate supersedes Certificate of Correction issued April 4, 2006.

Signed and Sealed this

Thirtieth Day of May, 2006

JON W. DUDAS
*Director of the United States Patent and Trademark Office*